(12) United States Patent
Gharib et al.

(10) Patent No.: US 12,510,449 B2
(45) Date of Patent: Dec. 30, 2025

(54) QUANTIFICATION OF SHEAR STRESS FIELD USING TUFT VISUALIZATION AND DEEP LEARNING

(71) Applicant: California Institute of Technology, Pasadena, CA (US)

(72) Inventors: Morteza Gharib, Altadena, CA (US); Emile K. Oshima, Pasadena, CA (US); Pablo Hermoso Moreno, London (GB)

(73) Assignee: California Institute of Technology, Pasadena, CA (US)

( * ) Notice: Subject to any disclaimer, the term of this patent is extended or adjusted under 35 U.S.C. 154(b) by 474 days.

(21) Appl. No.: 17/195,228

(22) Filed: Mar. 8, 2021

(65) Prior Publication Data

US 2021/0278330 A1   Sep. 9, 2021

Related U.S. Application Data

(60) Provisional application No. 62/986,505, filed on Mar. 6, 2020.

(51) Int. Cl.
| | |
|---|---|
| *G01N 3/12* | (2006.01) |
| *G01N 3/06* | (2006.01) |
| *G06F 30/15* | (2020.01) |
| *G06F 30/27* | (2020.01) |
| *G06F 30/28* | (2020.01) |

(Continued)

(52) U.S. Cl.
CPC ............... *G01N 3/12* (2013.01); *G01N 3/068* (2013.01); *G06F 30/15* (2020.01); *G06F 30/27* (2020.01); *G06F 30/28* (2020.01); *G06N 3/08* (2013.01); *G01N 2203/0246* (2013.01); *G01N 2203/0641* (2013.01); *G06F 2119/14* (2020.01)

(58) Field of Classification Search
CPC .. G01N 3/12; G01N 3/068; G01N 2203/0246; G01N 2203/0641; G06F 30/15; G06F 30/27; G06F 30/28; G06N 3/08
See application file for complete search history.

(56) References Cited

U.S. PATENT DOCUMENTS

| | | | |
|---|---|---|---|
| 6,380,535 B1 * | 4/2002 | Wetzel | G01P 5/10 |
| | | | 73/170.12 |
| 10,711,604 B2 * | 7/2020 | Johnson | E21B 43/267 |

(Continued)

OTHER PUBLICATIONS

D. R. Troolin and E.K. Longmire; "Large Format PIV to Resolve Large and Small Structures Surrounding a Gurney Flap"; Sep. 11-14, 2007 ; 7th International Symposium on Particle Image Velocimetry (Year: 2007).*

(Continued)

*Primary Examiner* — Manuel A Rivera Vargas
(74) *Attorney, Agent, or Firm* — KPPB LLP

(57) ABSTRACT

A system and method for estimating the shear wall stress of an aerodynamic surface using a tuft visualization technique combined with a physics-informed neural network. The tuft visualization technique is a simplified method of generating velocity profile data of an aerodynamic model that can subsequently be used to generate a shear wall stress profile of the model. Systems and methods described herein also provide for additional input data using an augmented tuft and taps inputs for the physics-informed neural network to generate the shear wall stress profile.

17 Claims, 14 Drawing Sheets

(51) Int. Cl.
G06N 3/08 (2023.01)
G06F 119/14 (2020.01)

(56) References Cited

U.S. PATENT DOCUMENTS

2012/0301296 A1* 11/2012 Greenblatt .............. F03D 7/06
416/1
2019/0047678 A1* 2/2019 Jaiswal .................... B64C 3/20

OTHER PUBLICATIONS

"Smoke and Tufts", NASA, Sep. 5, 2009, Retrieved from the Internet https://www.grc.nasa.gov/www/k-12/airplane/tunvsmoke.html.

Azabi et al., "Artificial Intelligence to Enhance Aerodynamic Shape Optimisation of the Aegis UAV", Machine Learning and Knowledge Extraction, Apr. 4, 2019, vol. 1, pp. 552-574; doi:10.3390/make1020033.

Bhargava et al., "An experimental study of near wall flow parameters in the blade end-wall corner region", NASA Scientific and Technical Information Division, 1989, 313 pgs.

Brunton et al., "Machine Learning for Fluid Mechanics", Annual Review of Fluid Mechanics, vol. 52, 2020, First published as a Review in Advance Sep. 12, 2019, pp. 477-508, https://doi.org/10.1146/annurev-fluid-010719-060214.

Dupuis et al., "Surrogate Modeling of Aerodynamic Simulations for Multiple Operating Conditions Using machine Learning", AIAA Journal, vol. 56, No. 9, Sep. 2018, doi: 10.2514/1.J056405.

Fang et al., "Neural Network Models for the Anisotropic Reynolds Stress Tensor in Turbulent Channel Flow", Journal of Turbulence, vol. 21, No. 9-10, 2020, pp. 525-543, doi: 10.1080/14685248.2019.1706742.

Freymeth, , "Flow visualization in fluid mechanics", Review of Scientific Instruments, vol. 64, No. 1, 1993, pp. 1-18, DOI:10.1063/1.1144433.

Genç et al., "A comparative evaluation of shear stress modeling based on machine learning methods in small streams", Journal of Hydroinformatics, vol. 17, No. 5, Apr. 28, 2015, pp. 805-816, doi: 10.2166/hydro.2015.142.

Glorot et al., "Understanding the difficulty of training deep feedforward neural networks", in the Proceedings of the 13th International Conference on Artificial Intelligence and Statistics, (AISTATS) 2010, Chia Laguna Resort, Sardinia, Italy, vol. 9 of JMLR:W&CP 9, pp. 249-256.

Hultmark et al., "Turbulent Pipe Flow at Extreme Reynolds Numbers", Physical Review Letters, vol. 108, No. 9, Mar. 2, 2012, doi: 10.1103/PhysRevLett. 108.094501.

Jagtap et al., "Locally adaptive activation functions with slope recovery for deep and physics-informed neural networks", Proceedings of the Royal Society, vol. A 476, Jul. 15, 2020, 20 pgs., https://doi.org/10.1098/rspa.2020.0334.

Khozani et al., "Shear Stress Distribution Prediction in Symmetric Compound Channels Using Data Mining and Machine Learning Models", Frontiers of Structural and Civil Engineering, vol. 14, Dec. 2019, pp. 1097-1109.

Liu et al., "Pressure and Temperature-Sensitive Paints", Berlin, Germain: Springer—Verlag Berlin Heidelberg, 2021, 552 pgs (presented in two parts).

Meinhart et al., "PIV measurements of a microchannel flow", Experiments in Fluids, vol. 27, Oct. 1999, pp. 414-419, DOI: 10.1007/s003480050366.

Minelli et al., "Active Aerodynamic Control of a Separated Flow Using Streamwise Synthetic Jets", Flow, Turbulence and Combustion, vol. 103, pp. 1039-1055, Aug. 30, 2019, doi: 10.1007/s10494-019-00058-4.

Omata et al., "Extracting quantitative three-dimensional unsteady flow direction from tuft flow visualizations", Fluid Dynamics Research, vol. 49, No. 5, Sep. 5, 2017, doi: : 10. 1088/1873-7005/aa8551.

Oweis et al., "The mean velocity profile of a smooth-flat-plate turbulent boundary layer at high Reynolds number", Journal of Fluid Mechanics, vol. 665, Dec. 2010, pp. 357-381, doi: 10.1017/S0022112010003952.

Raffel et al., "Particle Image Velocimetry: A Practical Guide", Cham, Switzerland: Springer International Published AG, 2007, 460 pgs.

Raissi et al., "Hidden fluid mechanics: learning velocity and pressure fields from flow visualizations", Science, vol. 367, No. 6478, Feb. 28, 2020, doi: 10.1126/science.aaw4741.

Raissi et al., "Hidden physics models: Machine learning of nonlinear partial differential equations", Journal of Computational Physics, vol. 357, Mar. 15, 2018, pp. 125-141, https://doi.org/10.1016/j.jcp.2017.11.039.

Simpson et al., "Detecting vortices within unsteady flows when using single-shot PIV", Experiments in Fluids, vol. 59, No. 125, Jul. 7, 2018, 13 pgs., https://doi.org/10.1007/s00348-018-2575-3.

Sin et al., "Methodology for Calculating Shear Stress in a Meandering Channel", U. S. Department of the Interior Bureau of Reclamation, Jun. 2012, 168 pgs.

Steinfurth et al., "Tuft Deflection Velocimetry: a simple method to extract quantitative flow field information", Experiments in Fluids, vol. 61, No. 146, Jun. 6, 2020, doi:10.1007/s00348-020-02979-7.

Tropea et al., "Springer Handbook of Experimental Fluid Mechanics", Berlin, Germany: Springer-Verlag Berlin Heidelberg, 2007, 1570 pgs. (presented in three parts).

Vey et al., "Extracting quantitative data from tuft flow visualizations on utility scale wind turbines", Journal of Physics: Conference Series, vol. 524, The Science of Making Torque from Wind 2014 (TORQUE 2014) Jun. 18-20, 2014, Copenhagen, Denmark, 11 pgs., doi:10.1088/1742-6596/524/1/012011.

Wang et al., "Physics Informed Machine Learning Approach for Reconstructing Reynolds Stress Modeling Discrepancies Based on DNS Data", Physical Reviews Fluids vol. 2, 034603, Feb. 27, 2017, arXiv:1606.07987v2, 36 pgs.

Wang et al., "Understanding and Mitigating Gradient Pathologies In Physics-Informed Neural Networks ETWORKS", arXiv:2001.04536v1 [cs.LG] Jan. 13, 2020, 28 pgs.

Westerweel et al., "Particle Image Velocimetry for Complex and Turbulent Flows", Annual Review of Fluid Mechanics, vol. 45, No. 1, Jan. 2013, pp. 409-436, DOI:10.1146/annurev-fluid-120710-101204.

Willert, , "High-Speed Particle Image Velocimetry for the Efficient Measurement of Turbulence Statistics", Experiments in Fluids, vol. 56, No. 17, Jan. 13, 2015, doi: 10.1007/s00348-014-1892-4.

Yang et al., "B-PINNs: Bayesian physics-informed neural networks for forward and inverse PDE problems with noisy data", Journal of Computational Physics, vol. 425, Jan. 15, 2021, 109913, https://doi.org/10.1016/j.jcp.2020.109913.

* cited by examiner

QUANTIFICATION OF SHEAR STRESS FIELD USING TUFT VISUALIZATION AND DEEP LEARNING

CROSS-REFERENCED APPLICATIONS

This application claims priority to U.S. Provisional application 62/986,505 filed on Mar. 6, 2020, the disclosure of which is included herein by reference in its entirety.

FIELD OF THE INVENTION

The present invention generally relates to obtaining high spatial resolution flow fields with respect to aerodynamic surfaces. More specifically, utilizing various visualization and deep learning techniques to evaluate shear stress fields on an aerodynamic surfaces.

BACKGROUND

Wind tunnel testing is an integral part of most modern-day aircraft design or flow physics research. Several diagnostic tools and techniques have been developed to measure, visualize and better understand the flow field around aerodynamic models. The many different techniques illustrated represents the various challenges and technical trade-offs often found when dealing with such systems. For example, often times such techniques may include trade-offs between data volume, spatiotemporal range and resolution, flow intrusiveness, optical and physical access, and implementation cost.

Wind tunnel testing can provide important insight to aerodynamic stresses that aerodynamic surfaces are exposed to. Accordingly, surface pressure measurements can reveal the distribution of aerodynamic loads and provide critical information on shock strength, and boundary layer transition. Some of the more common techniques to measure surface static pressure can be done by connecting transducers to small orifices drilled perpendicular to the surface called taps. The taps method can be reliable but requires careful design considerations due to the need for physical access to place the taps and associated wiring around the surface to be evaluated. Accordingly, spatial limitations can result in reduced spatial resolution due to the possible reduction in taps that can be installed.

Other methods can involve the use of Pressure Sensitive Paint (PSP) which uses a polymer coating whose luminescence varies with air pressure under specific excitation wavelengths. PSP often requires an extensive calibration as well as optical access in order to achieve accurate results. As can be appreciated many of the current methods used are often expensive and time consuming. This tends to offer little in the way of improved systems and methods to accurately and efficiently study aerodynamic surfaces for improved design.

SUMMARY OF THE INVENTION

Many embodiments are directed a method for determining shear wall stress in accordance with the following steps:
Providing a model of an aerodynamic surface;
Determining the spatial coordinates of the model for use as a first set of input variables;
Disposing the model within a testing system;
Determining the spatial coordinates of the testing system for use as a second set of input variables;
Connecting a plurality of tufts to the model in a manner such that the tufts can flow freely in a direction of an applied flow;
Applying a generally horizontal dynamic flow force to the model thereby creating movement of the plurality of tufts;
Using a camera visualization system to generate input data from the movement of the tufts for use as a third set of input variables;
Applying the first, second, and third sets of input variables to a physics informed neural network to generate a set of output flow variables;
Utilizing the output flow variables to determine velocity profile of the model; and
Utilizing the velocity profile as well as a set of pressure outputs of the model to estimate the shear walls stress of the model.

In other embodiments, the method of includes performing automatic differentiation on the set of output flow variables to generate a set of residual data wherein the set of residual data is used to generate a loss function and wherein the loss function is used to augment the sets of input variables to improve the output flow variables.

In still other embodiments, the method includes disposing a plurality of pressure taps on the model wherein each of the plurality of pressure taps can generate pressure data with respect to the dynamic flow force and wherein the pressure data is used as a fourth set of input variables. Additionally, the fourth set of input variable is utilized to generate the output flow variables.

In yet other embodiments, the model is an airfoil

In still yet other embodiments, the model is a scaled model of an aircraft

In other embodiments, the model is disposed at an angle with respect to the horizontal direction of the dynamic flow force.

In still other embodiments, a plurality of pressure taps may be disposed within the testing system, wherein the pressure taps are used to generate and provide pressure data with respect to the dynamic flow force within the testing system.

Other embodiments are directed to a system for estimating the shear wall stress of an aerodynamic surface where the system has:
a testing apparatus wherein the testing apparatus is configured to generate a dynamic flow force;
a model disposed within the testing apparatus in such a manner that the model is exposed to the dynamic flow force;
a plurality of tufts disposed on an outer surface of the model such that the plurality of tufts can be moved by the exposure to the dynamic flow force; and
at least one camera visualization system configured to capture image data of the movement of the tufts when exposed to the dynamic flow force and wherein the image data can be used in a physics-informed neural network to estimate the shear wall stress of the model.

In still yet other embodiments, the plurality of tufts and image data can be used to generate a first set of input variables that can be used to determine the wall shear stress of the model.

In other embodiments, the testing apparatus comprises a plurality of spatial coordinates that can be used as a second set of input variables, wherein the first and second set of input variables can be applied to the physics-informed neural network to estimate the wall shear stress of the model.

In still other embodiments, the system has a plurality of pressure taps disposed on the model wherein each of the plurality of pressure taps can generate pressure data with respect to the dynamic flow force and wherein the pressure data is used as a third set of input variables.

In yet other embodiments, the apparatus is a wind tunnel.

In still yet other embodiments, the angle is at least 2 degrees off of horizontal.

In other embodiments, the angle does not exceed 12 degrees off of horizontal.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods used to estimate the shear stress along an aerodynamic surface using tuft visualization techniques combined with physics-infused machine learning are disclosed. Many embodiments include applying a number of tufts along the surface of an aerodynamic surface. The aerodynamic surface can be a model for placement in a wind tunnel or another type of testing facility. Accordingly, the system may implement a number of different camera systems to perform visualization on the tufts. In a number of embodiments, the surface model can be used to determine a number of spatial coordinates of the system including the model and wind tunnel or testing facility. The wind tunnel or testing facility can subsequently be used to apply a dynamic flow across the aerodynamic surface thereby activating the movement of the tufts along the aerodynamic surface. Based on the movement of the tufts, various embodiments can thus generate output flow variables by use of a physics-infused neural network. The neural network, according to various embodiments, can be used to perform automatic differentiation on the output variables and thus generate residual loss data. Subsequently, many embodiments can be used to compute the loss function that can ultimately be used as further input into the neural network to improve the output pressure data with respect to the aerodynamic surface. In accordance with many embodiments, output data can subsequently be used to estimate the shear stress along the aerodynamic surface of the model. In accordance with some embodiments, air taps are used in conjunction with tuft visualization to generate output data for use in estimating the shear stress from the model.

As previously discussed, surface pressure measurements can help to reveal the distribution of aerodynamic loads on a model and provide critical information on shock strength, separation, and boundary layer transition. Additionally, velocity readings are crucial to the diagnosis of turbulence, wake and vortex structures, and flow separation. Commonly employed single-point methods include pitot tubes and hot wire anemometry which rely on differential measurements in pressure and temperature, respectively, caused by the passage of air over the sensors. These instruments can be traversed to map the domain interest at high resolution but are intrusive and cannot detect unsteady flow structures. More advanced techniques based on imaging tracer particles seeded into the flow are non-intrusive and able to resolve velocity fields in both space and time. However, many such techniques tend to be too expensive and time consuming in order to be able to extract the data necessary to provide reliable results.

Figure 1:
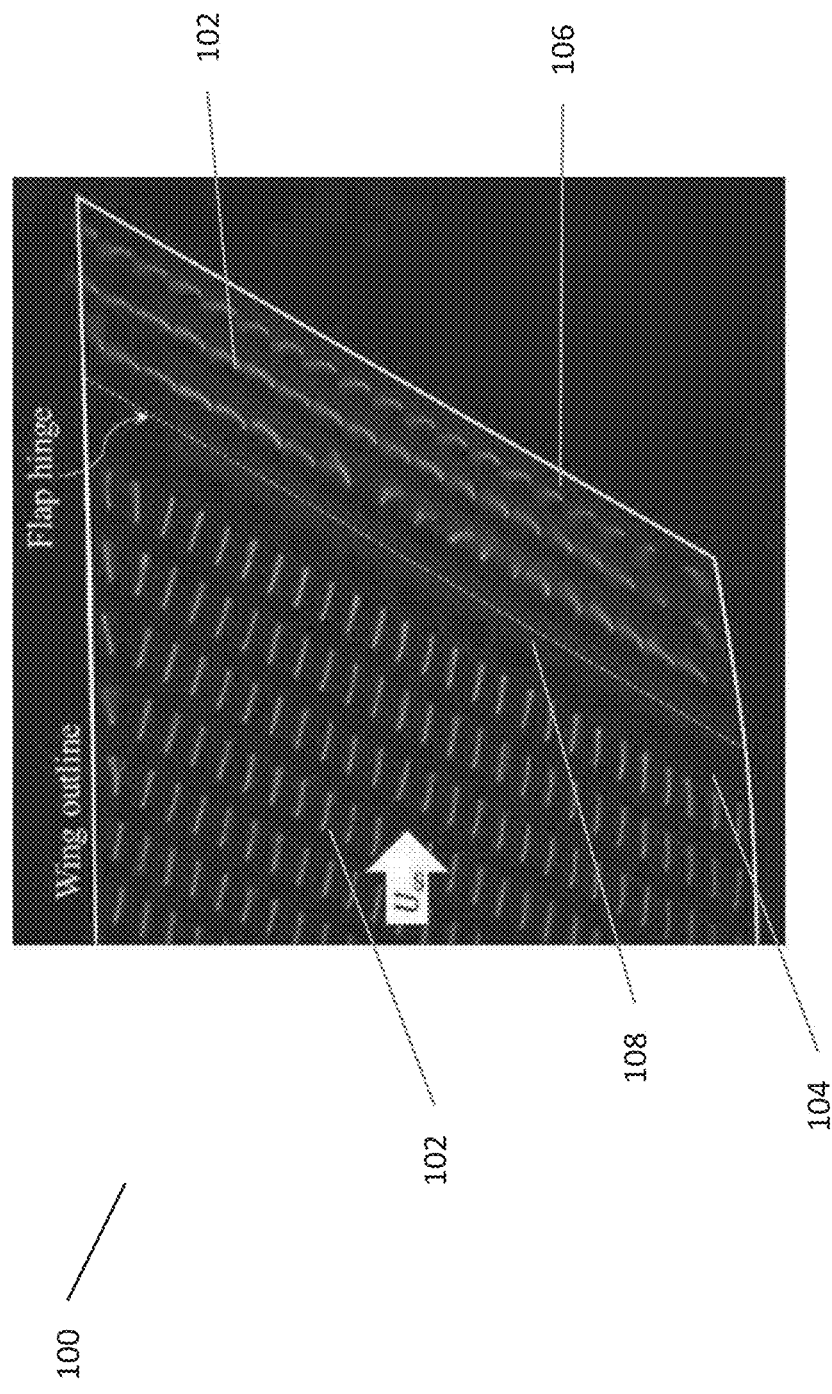
FIG. 1 illustrates a tuft visualization field in accordance with embodiments of the invention.

Both sensor and imaging-based techniques not only suffer from cost and time consumption but also suffer in performance near the model surface. Accordingly, many embodiments implement more qualitative visualization techniques to analyze the surface pressure and estimate various boundary conditions of the model including shear stress. Many such embodiments utilize tufts or forms of tuft visualization. The use of tufts or tufting is on of the oldest flow visualization techniques that can be used in experimental aerodynamics and remains one of the most popular methods used today. This is primarily due to the simple, cost-effective, and relatively non-intrusive implementation ability the method offers. Tufts are small pieces of frayed string that are attached to a surface of an aircraft or model that can provide diagnostic information in the boundary layer flow along the aircraft and model. Accordingly, the tuft visualization can allow for observation and detection of attached flow, unsteady flow, and strong crossflow. FIG. 1, for example, illustrates an image of wing model 100 equipped with a number of fluorescent tufts 102 attached to a wing model 100 along the wind surface 104 as well as the flap 106 separated by a flap hinge 108. It can be seen that the positions of the tufts can illustrate various flows along the surface of the wing model 100. As both sensor and imaging-based techniques can suffer in performance near the model surface, many experimentalists often turn to qualitative visualizations.

Although many embodiments may employ the use of tufts along an aerodynamic surface, some embodiments may utilize oil-clay mixtures applied to the upstream end of the model. The oil evaporates with the airflow and can leave behind streak like particles. This technique can indicate flow direction as well as provide information surrounding boundary layer properties such as separation, reattachment, and unsteadiness. Furthermore, such qualitative visualizations with improved image processing technologies to extract quantitative 2D and 3D flow configurations.

Figure 2:
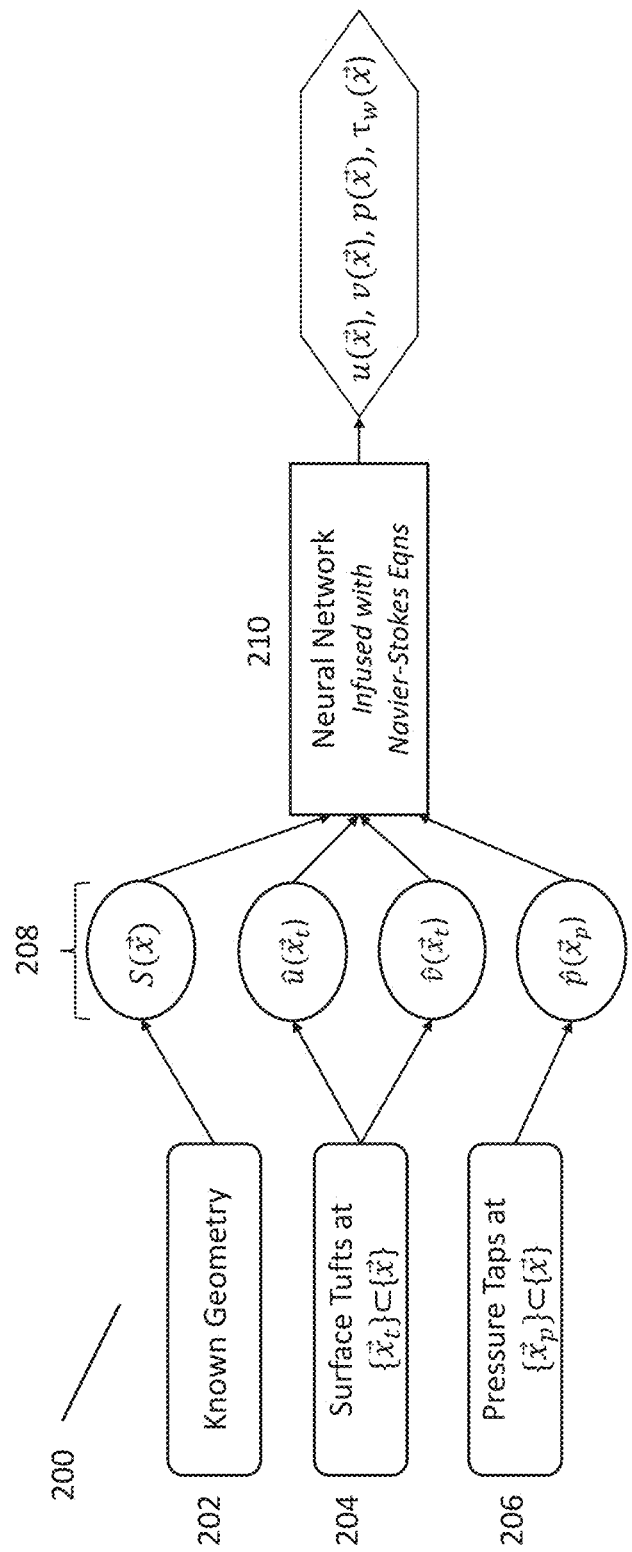
FIG. 2 illustrates a schematic of a shear stress estimation methodology in accordance with embodiments of the invention.

In accordance with many embodiments, simple methods such as tuft visualization can be combined with physics-informed neural networks that utilize deep learning algorithms to provide a flexible platform for data enhancement that can greatly expand the wind tunnel or test system data. For example, FIG. 2 illustrates an example of a stress estimation methodology 200 that can utilize or combine known geometric data 202 from the overall system and model with the surface tufts 204 in conjunction with pressure tap data 206 from taps placed in and around the model as input data 208. Subsequently, the data can be used within a physics infused neural network 210 to estimate a number of different flow properties including the shear wall stress and other global quantities such as, but not limited to, lift, drag, and skin friction of the model.

Shear stress determines how much friction drag an aircraft experiences and its accurate quantification can be crucial to aeronautical engineering and research. Shear wall stress at a solid surface can be defined by equation 1 below.

$$\tau_w = \mu \frac{\partial u}{\partial z} \quad (1)$$

Here μ is the dynamic viscosity of air and $$\frac{\partial u}{\partial z}$$

is the gradient or now velocity along the wall normal direction. As such, obtaining the velocity profile very close to a surface can be extremely challenging. However, many embodiments can utilize the tuft visualization technique combined with deep machine learning to provide a more economical solution to estimating the shear wall stress on the aerodynamic surface.

Figure 3:
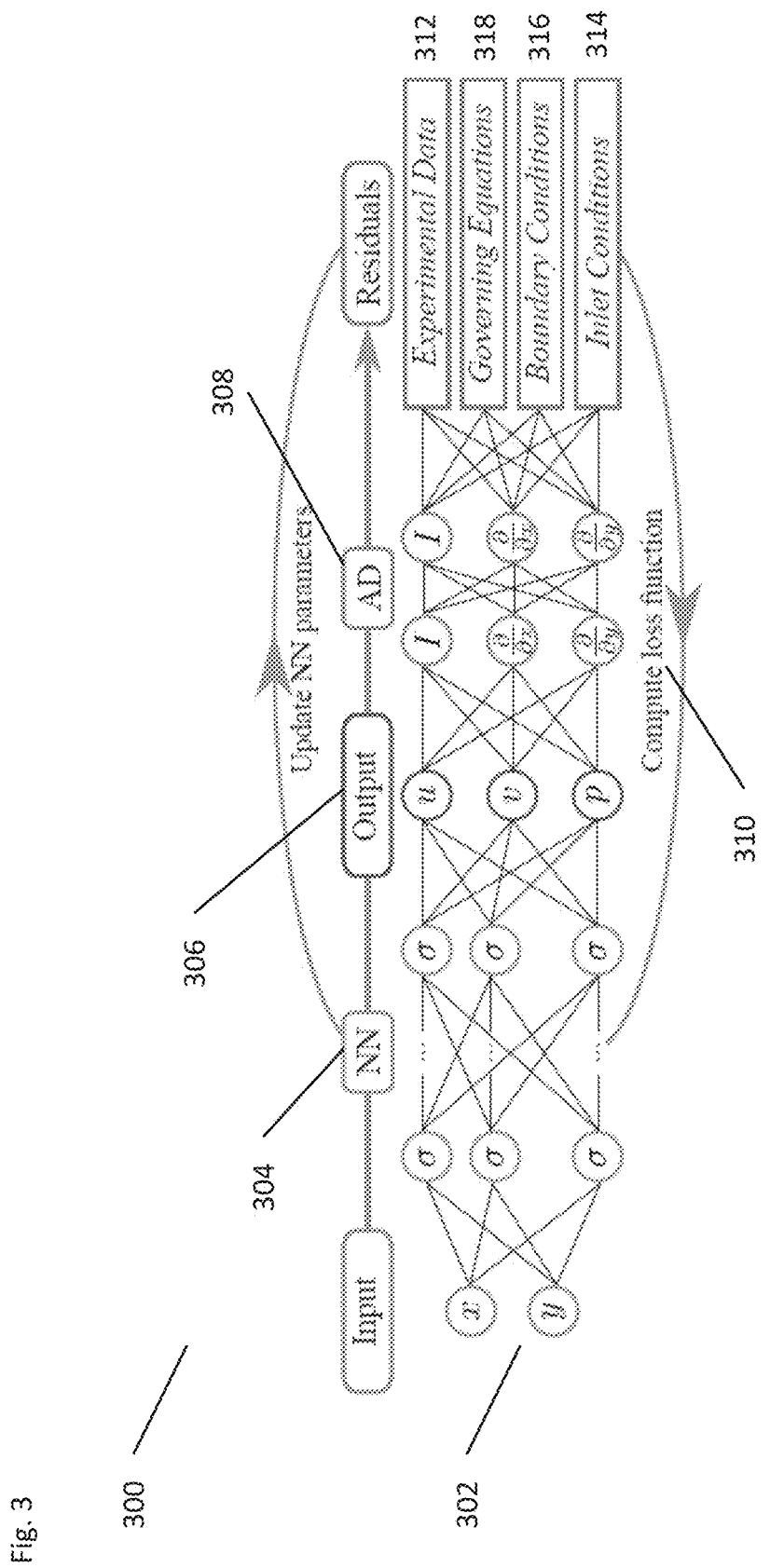
FIG. 3 illustrates a neural network architecture in accordance with embodiments of the invention.

As can be appreciated, neural networks can be useful in extracting information from large datasets that may not otherwise be cost efficient. Accordingly, many embodiments can be configured to utilize a neural network similar to that illustrated in FIG. 3 to analyze tuft visualization data to determine various flow properties of an aerodynamic flow across a surface. Neural networks operate in a web of weighted linear and/or non-linear functions called neurons that maps the input to an output. FIG. 3 illustrates a tuft visualization network architecture in accordance with various embodiments. The neural network 300 can utilize spatial coordinates 302 that can be predetermined as inputs. The network 304 can then map the data into various output flow variables 306. Subsequently, the system can utilize automatic differentiation (AD) 308 which enables the computation of data-driven and physics-informed residuals. AD does not suffer from numerical diffusion or dispersion of more classic numerical techniques because it differentiates the neural network itself rather than the data. This enables loss function definitions that are driven not only by data but also by governing physical laws and conditions which results in a "Physics-informed" neural network.

Loss function 310 is a linear combination of the residuals. The baseline loss function, in accordance with various embodiments, can consist of four residual components quantifying deviations from the provided data. For example, experimental data like 312 pressure and flow direction, inlet conditions 314, boundary conditions 316 and governing equations 318. Such residuals can then be fed back into the network to improve output variables. Thus, the system can learn from output data on how to better improve the analysis and thus generate a more accurate estimation of the flow variables such as shear wall stress.

Figure 4:
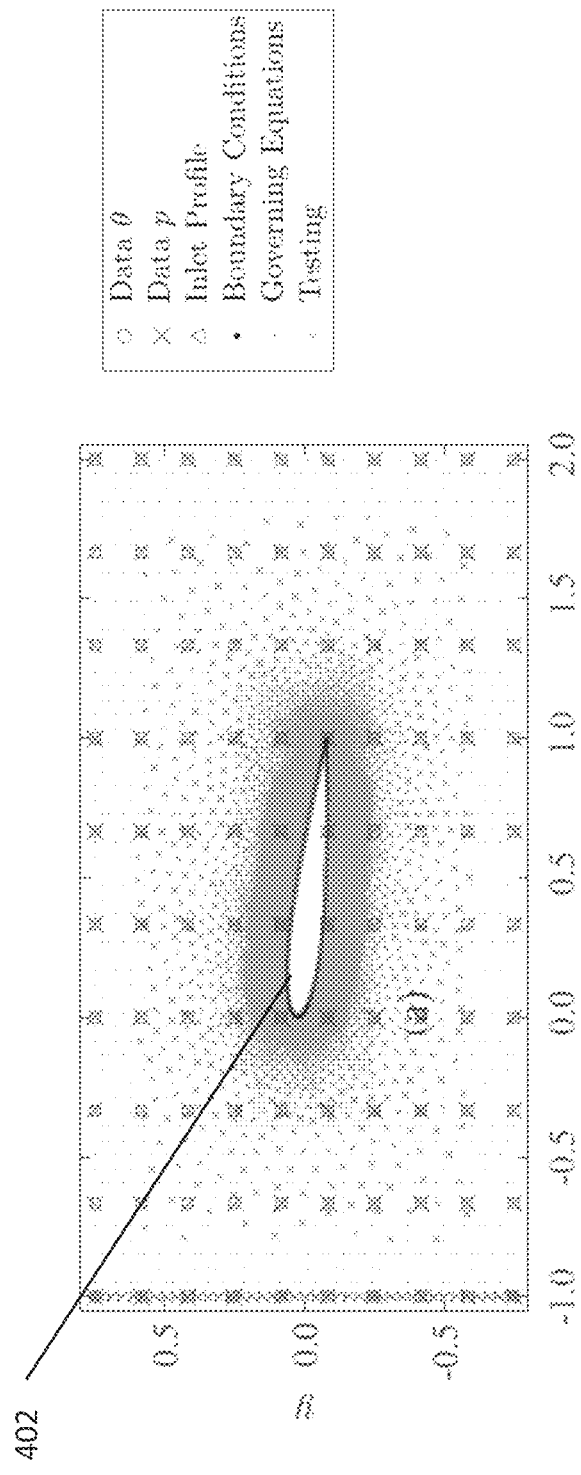
FIG. 4 illustrates a profile of an aerodynamic surface with a variety of input points that can be used with a neural network in accordance with embodiments of the invention.

Referring now to FIG. 4, a sampling of input points applied to a simulated 2D flow over an airfoil 402 at a particular angle of attack. The formulation of the Navier-Stokes equations at the boundary conditions are solved via the finite volume method using a stander segregated flow solver. Air was modelled as an ideal gas with constant viscosity and the no-slip boundary condition is enforced on the airfoil surface. Regression can be performed using a neural network. In various embodiments, the neural network may have seven layers, each with 250 neurons. Accordingly, the equations (2-5) below illustrate variables that can be used to properly condition and normalize the data in order to fully illustrate the capabilities of the algorithm.

$$x = \frac{X}{c}, \quad (2)$$

$$u(x) = \frac{U}{U_\infty}, \quad (3)$$

$$p(x) = \frac{P - P_\infty}{p_\infty U_\infty^2}, \quad (4)$$

$$R_e = \frac{U_\infty c}{v} \quad (5)$$

Where c is the airfoil chord length, v is the kinematic viscosity, and $U_\infty$, $P_\infty$, $p_\infty$ are the freestream velocity, pressure, and density respectively.

The profile of the airfoil 402 in FIG. 4 illustrates an example set of input points that can be provided to a tufts visualization neural network where data for p and 8 are provided over a sparse rectangular grid of points. The coordinates illustrated, coincide due to the nature of the simulation output. However, such formatting restriction is not necessary because it is unlikely that wall taps would overlap with tufts during testing. Residuals for each set of points are defined using standard mean square error in a number of embodiments. Data driven residuals can be written in terms of the difference between reference and regressed values while physics-informed residuals can be written in terms of regressed values only. In accordance with many embodiments, physics informed residuals use to enforce the p-θ data and the no-slip boundary conditions can be represented by equations 6 and 7 below:

$$R_{p\theta} = \frac{1}{N_{p\theta}} \sum \left[ (p'_x - p^*)^2 + (\hat{u}'_x - \hat{u}^*_x)^2 + (\hat{u}'_y - \hat{u}'_y)^2 \right] \quad (6)$$

$$R_{bc} = \frac{1}{N_{bc}} \sum [(u^*)^2 + (v^*)^2] \quad (7)$$

Figures 5A, 5B:
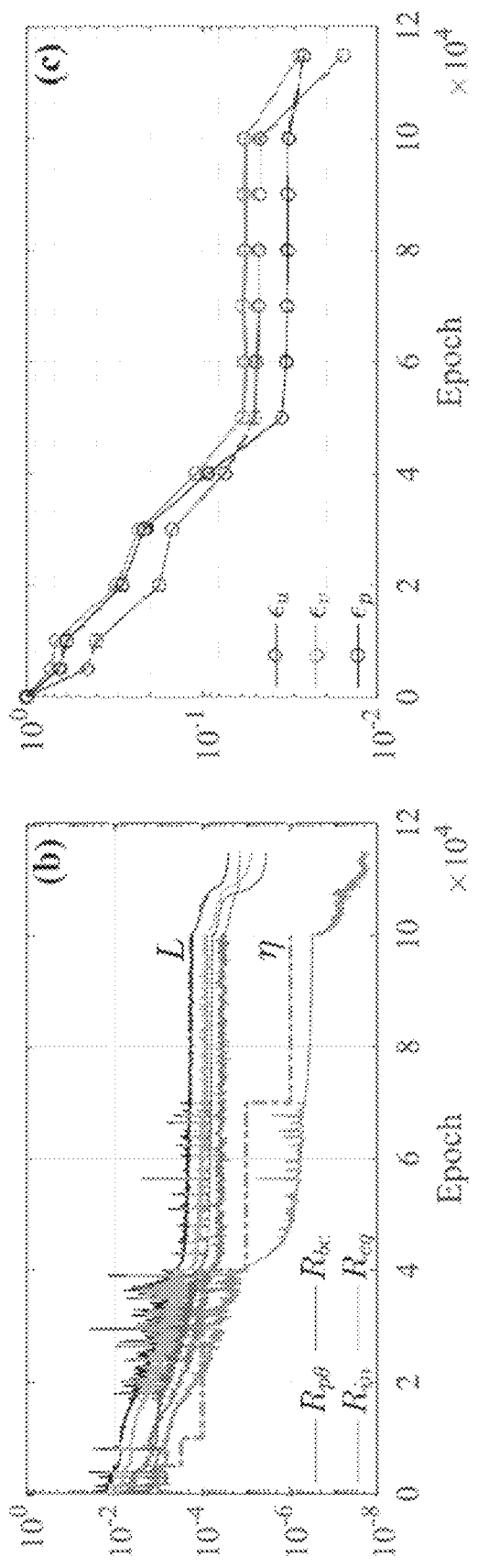
FIGS. 5A and 5B are graphical illustrations of residual components (a) and testing errors (b) in accordance with embodiments of the invention.
Figure 6:
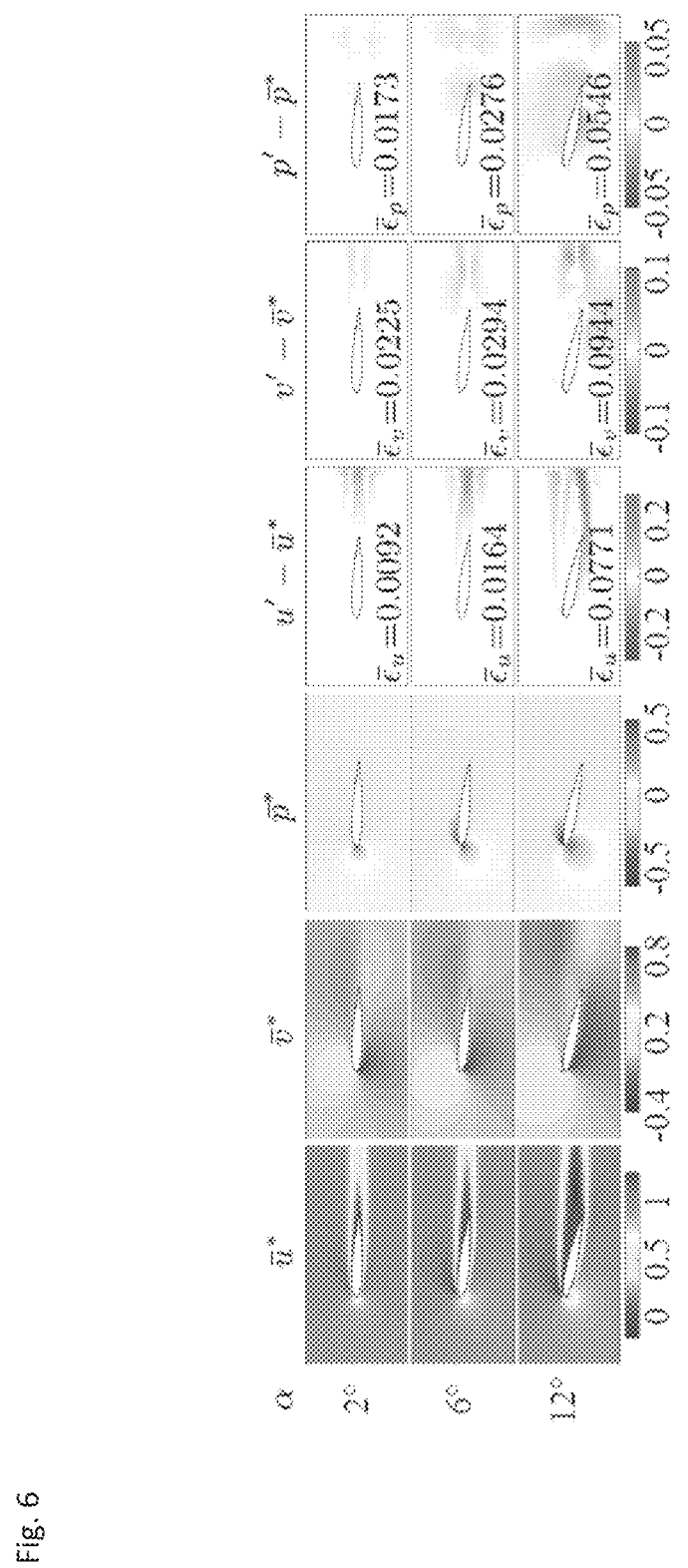
FIG. 6 illustrates a graphical visualization of regression fields on an airfoil at different angles in accordance with embodiments of the invention.

As can be more readily seen in FIGS. 5A and 5B the residual components in FIG. 5A and testing errors in FIG. 5B illustrate the ability of a physics-informed neural network to learn the correct flow field by minimizing the loss function. Accordingly, the testing accuracy can improve over time until the neural network learns the full flow field. In accordance with various embodiments, regression can be performed for various angles of attack. For example, FIG. 6 illustrates the regression results of three different angles of attack of an airfoil, that demonstrate the ability of a tufts physics-informed neural network to reconstruct accurate estimates of velocity and pressure using limited data and can subsequently be used to estimate the shear stress along the airfoil surface.

Figure 7:
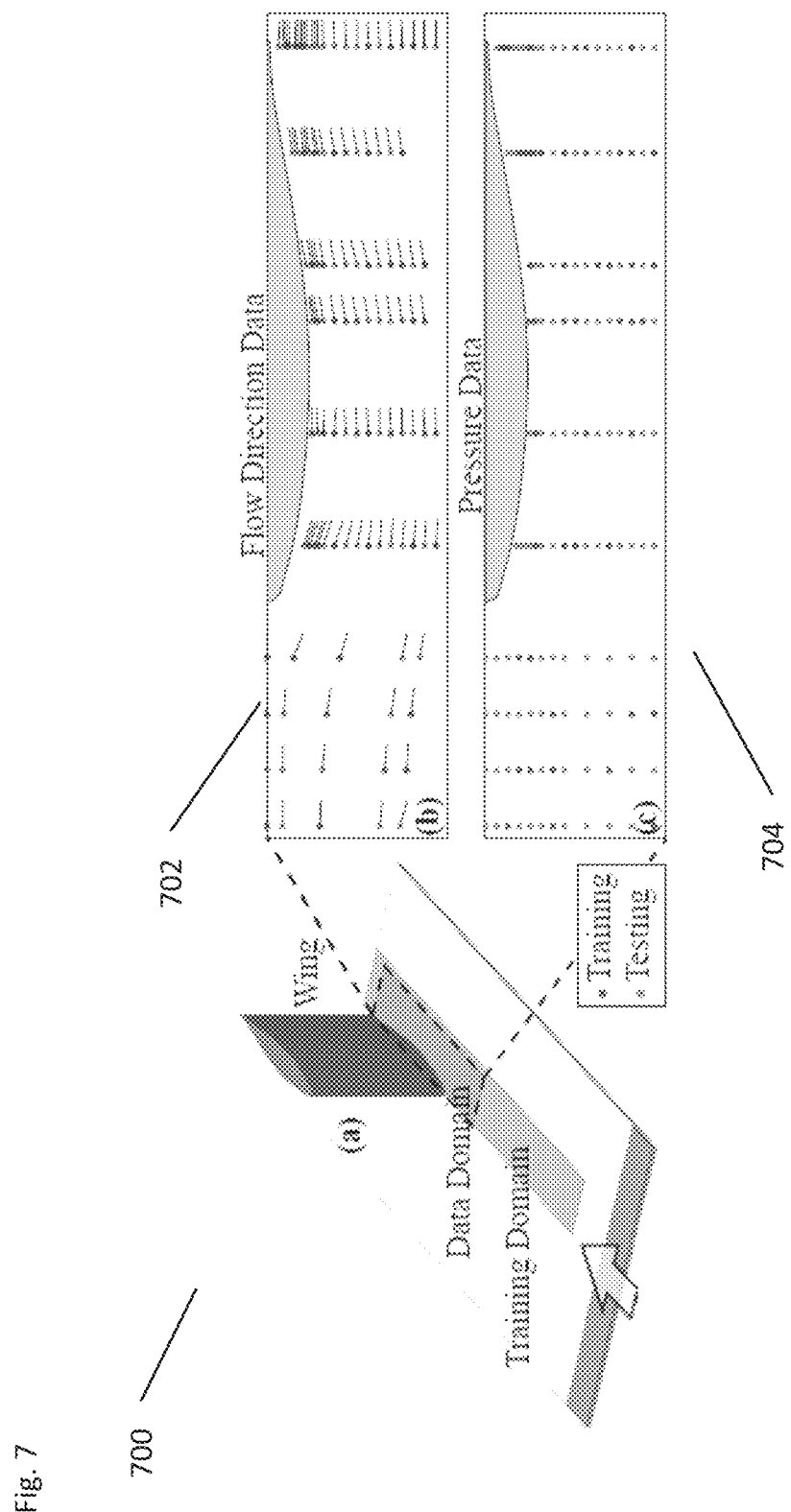
FIG. 7 illustrates a wing-plate set up with tuft visualization points in accordance with embodiments of the invention.
Figure 8A:
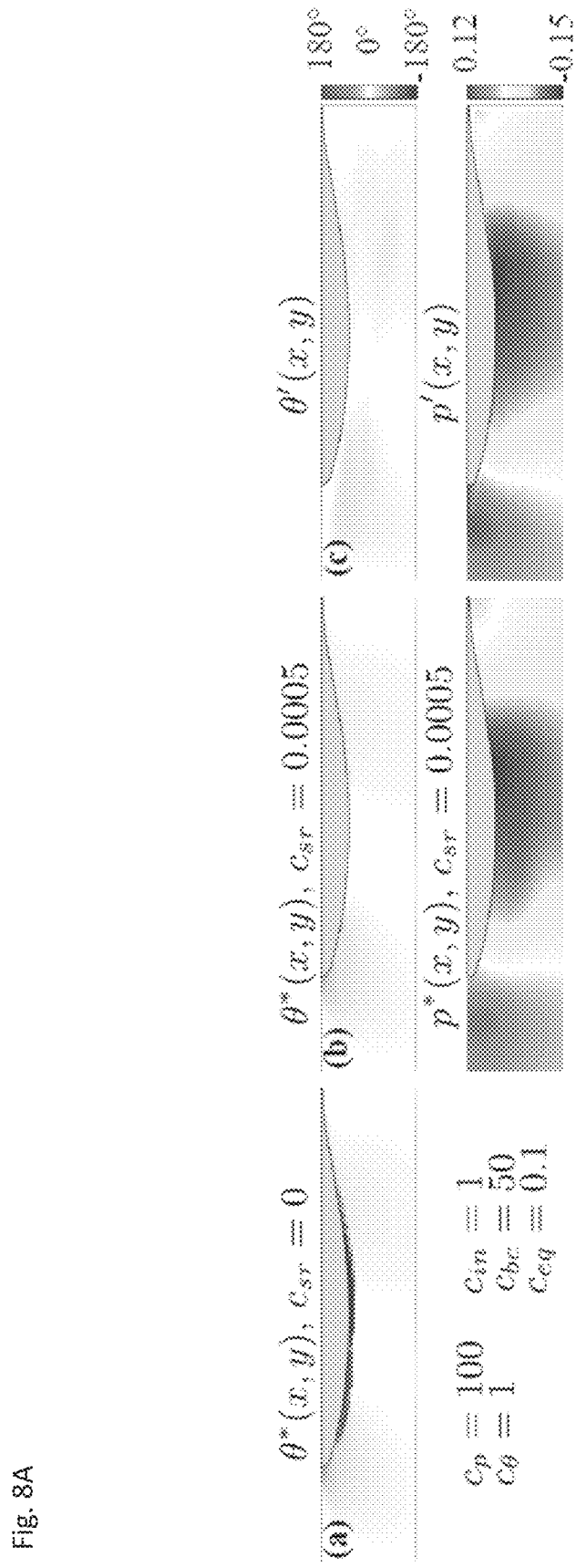
FIGS. 8A and 8B illustrates the prediction of a neural network with respect to various conditions around an airfoil in accordance with embodiments of the invention.
Figure 8B:
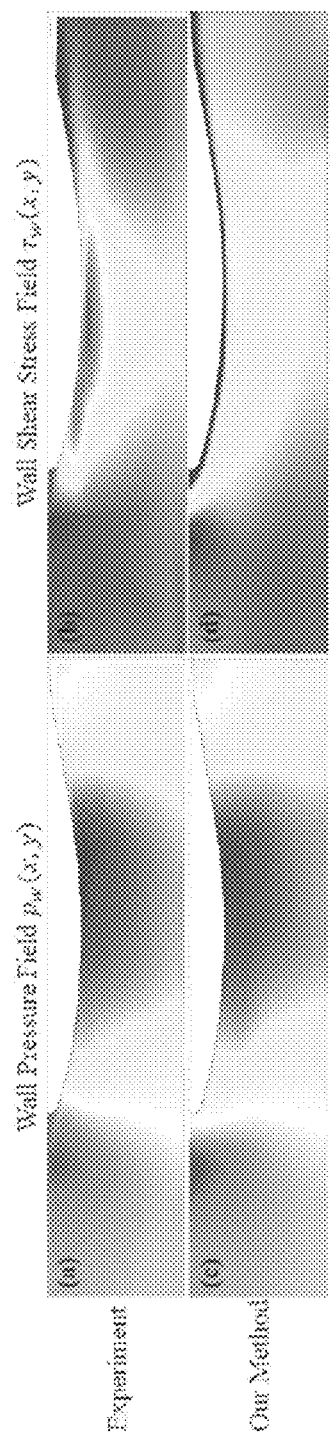

Although the illustrations provided above were generally applied to a 2D surface, the same principles can be implemented with 3D flow surfaces to illustrate the ability of a tufts physics-informed neural network to generate dense pressure and velocity flow fields given limited input data. For example, FIG. 7 illustrates a 3D flow model 700 with flow direction data 702 provided by tufts and pressure data 704 provided by taps. Subsequently, FIG. 8 illustrates a visual comparison of the experimental and regressed flow fields along with manually tuned loss function coefficients. In some embodiments, a "smoothness regularization" (SR) residual term can be used within the algorithm that penalizes large gradients in flow direction and can be illustrated by equation 8 below:

$$R_{sr} = c_{sr} \left( \frac{1}{N_{eq}} \sum (\nabla \theta)^2 \right) \quad (8)$$

As can be seen in FIG. 8 the implementation of an SR can eliminate flow reversals and improve regression quality, thus highlighting the flexibility of a tufts physics-informed neural network in confining the solution space through both data-driven and physics-informed residuals. Additionally, the results of the SR can illustrate the robustness of such systems within wind tunnel data of 3D flows at high Reynolds number.

Utilizing the outputs of full velocity profiles generated from a tufts physics-informed neural network can ultimately be used to accurately estimate the wall shear stress of the model. By definition, wall shear stress requires a knowledge of the near-wall velocity profile, which by more traditional methods can be difficult to obtain. However, as illustrated herein, many embodiments can utilize tuft visualization data within a physics-informed neural network to generate full velocity profiles. In other words, many embodiments can implement the use of sparse data measurements to ultimately estimate the shear stress along the surface of the model. Additionally, many embodiments can be capable of mapping the shear stress field on the model surface with Height spatial resolution.

Figure 9:
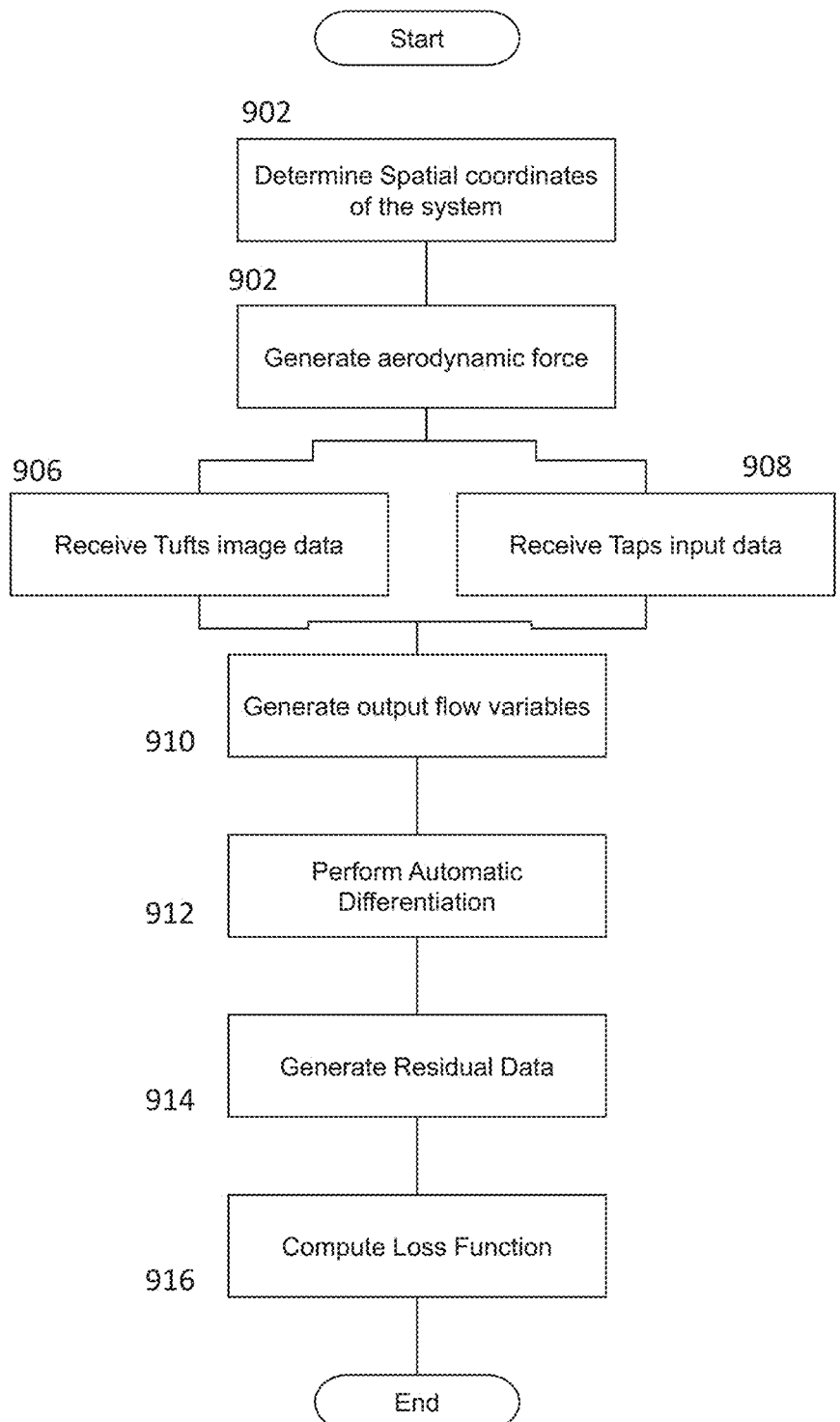
FIG. 9 illustrates a process flow diagram of evaluating tuft flow visualization in accordance with embodiments of the invention.
Figure 10A:
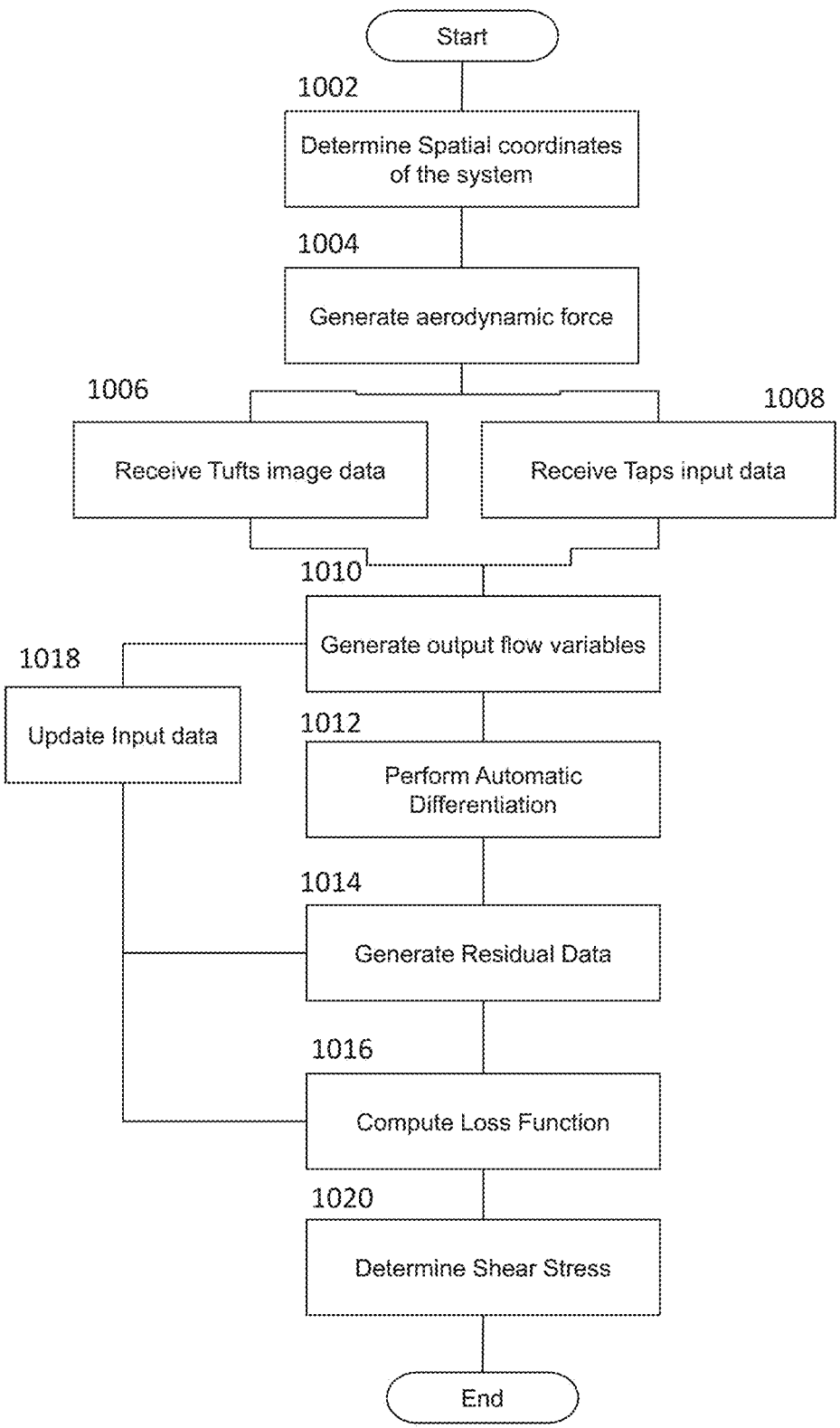
FIGS. 10A and 10B illustrate process flow diagrams of estimating shear stress along an aerodynamic surface in accordance with embodiments of the invention.
Figure 10B:
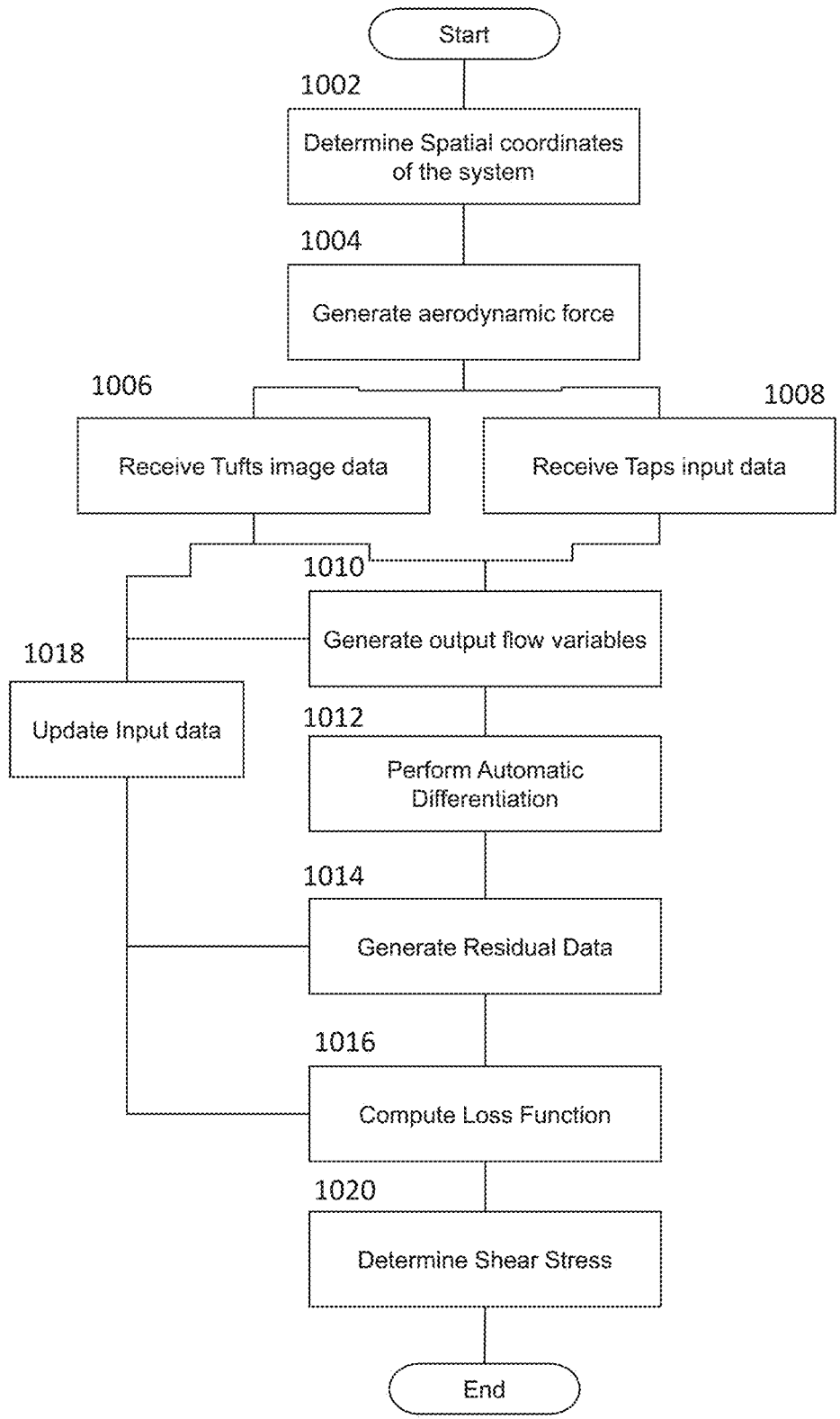

As can be appreciated, many embodiments may include the use of a wind tunnel to generate data that can be used within the physics-informed neural network to estimate the velocity profiles and ultimately the shear wall stress along the aerodynamic surface. As such, many embodiments may incorporate a number of different steps within a process to generate the desired profiles. For example, FIG. 9 illustrates a process flow of generating a velocity profile of a model in accordance with some embodiments. Initially, the spatial coordinates of the system, which include the geometric data from the wind tunnel as well as that of the model must be obtained by a user (902) in order for that data to be used within the neural network. Additionally, such data can include the placement location of tufts and/or taps that can be used to provide input data. A wind tunnel or similar equipment 910 can then be used to activate the tufts and/or taps along the model by applying an aerodynamic force to the model (904). Once the tufts and/or taps are activated each variable element can generate input data (906 and 908 respectively) for use within a neural network. The neural network can subsequently be used to generate output flow variables (910). In accordance with many embodiments, the system can then apply an automatic differentiation (912) to the output flow variables to generate residual data (914) as described previously. The system can also generate a loss function (916) that can subsequently be applied as an input into the physics informed neural network to improve the function of the network. Similarly, FIG. 10A illustrates a process flow in which the input data can be augmented 1018 by the loss function and residuals to improve the output flow variables. Subsequently, this can help to improve the accuracy of the system in determining the shear stress 1020. FIG. 10B additionally is a slight modification to the process flow illustrated in FIG. 10A where output flow variables (910) can be updated further with additional image data from the tufts (1006).

Figure 11:
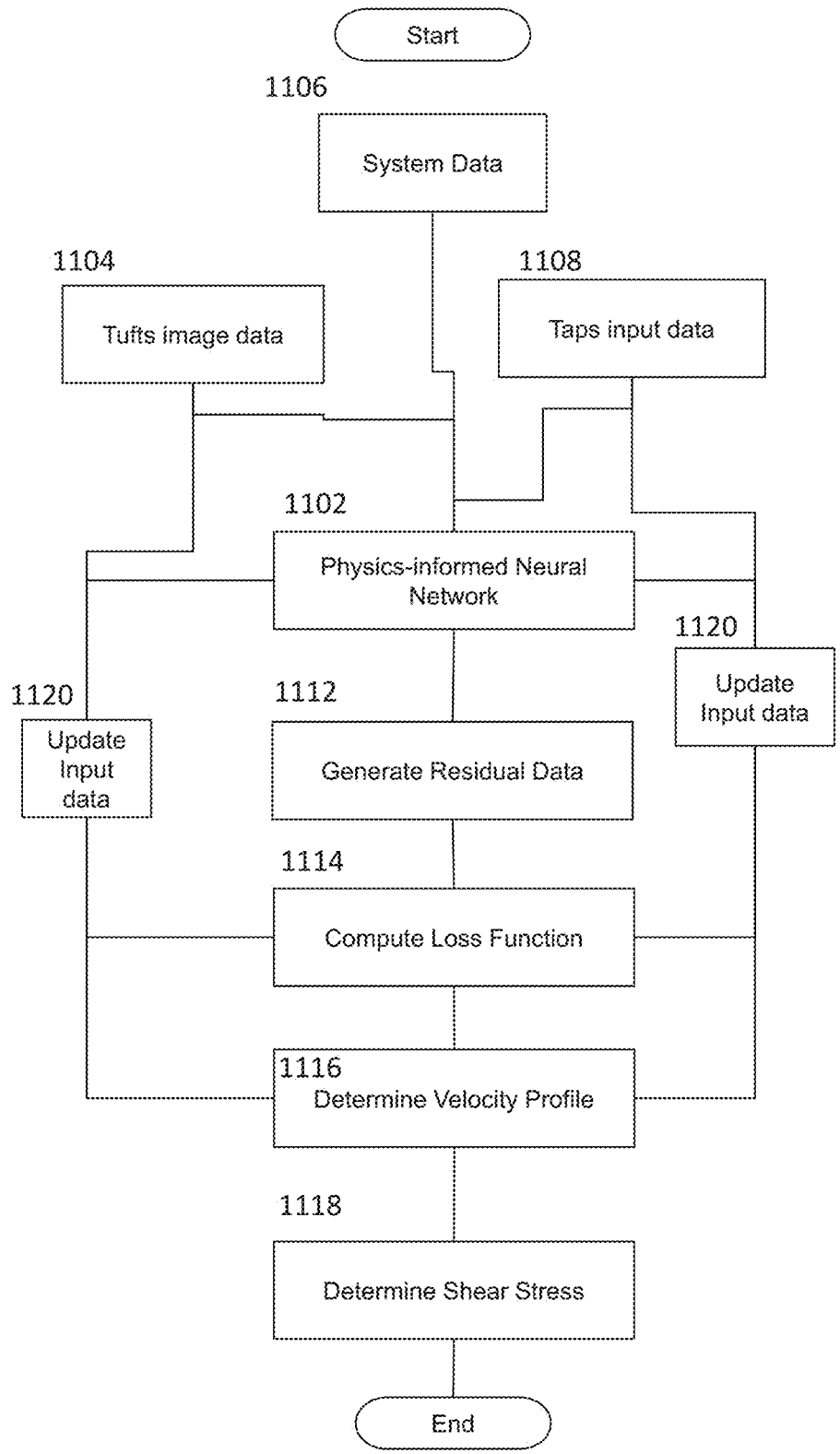
FIG. 11 illustrates a process flow diagram of training a physics informed neural network in accordance with embodiments of the invention.

As can be appreciated, the process flows not only illustrate methods of determining shear stress along the aerodynamic model, but can also illustrate the methods of training the neural network. For example, FIG. 11 illustrates a process flow in which the neural network can be trained or updated with ongoing information in order to generate the output data required. In accordance with many embodiments, the physics informed neural network 1102 can receive input data tufts images 1104, physical characteristics of the system 1106, and pressure or tap pressure data 1108. Subsequently, the physics informed neural network 1106 can follow the similar processes described above with respect to FIGS. 9 through 10B in generating residual data (1112), computing the loss function (1114) and determining the velocity profile (1116). As a neural network works through the Navier Stokes equations to ultimately determine the shear stress profile (1118) the neural network can be updated (1120) by continual data from the tufts images 1104 and pressure taps 1108. Accordingly, the physics-informed neural network can improve the outputs based on how the input changes thereby ultimately generating the shear stress profile faster and more efficiently.

Figure 12:
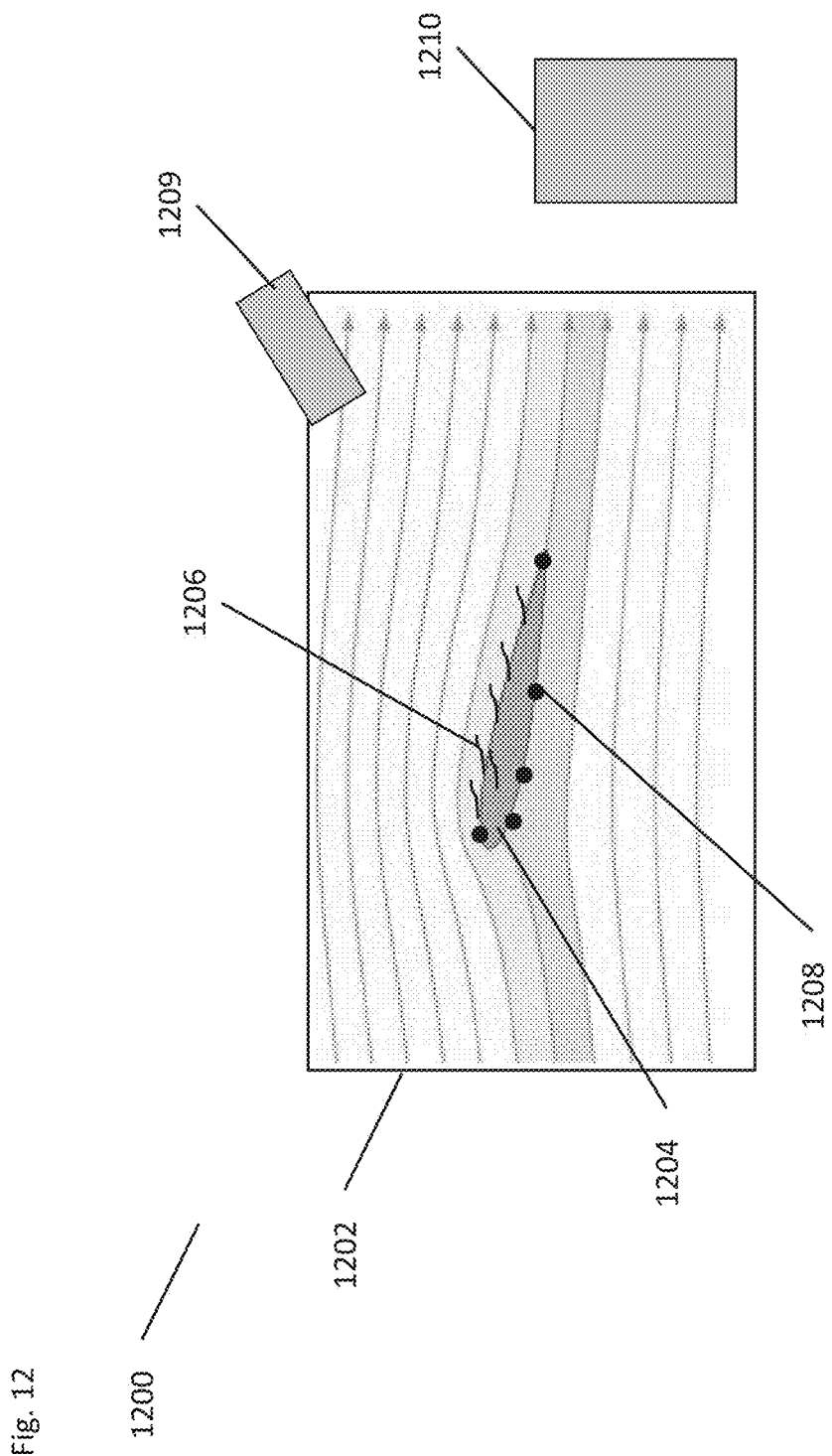
FIG. 12 illustrates a sample system for generating data necessary to estimate the shear wall stress in accordance with embodiments of the invention.

FIG. 12 illustrates a simple system that can function in accordance with the process described in FIGS. 9 through 11. For example, in various embodiments the system 1200 may include a wind tunnel 1202 with a model 1204 disposed within the tunnel 1202. Various embodiments can place the model on some type of apparatus that supports the model in such a way to take full advantage of the wind tunnel. Some embodiments may be a model of a wing attached at one end to a mounting apparatus. Other embodiments may be a scaled model of an aircraft or other vehicle attached to a mounting apparatus. Furthermore, the model can be positioned at any angle with respect to the flow direction such that the data generated can be reflective of the various potential positions of the model. For example, the model 1204 may be at a 2-degree angle with respect to the horizontal flow of the wind tunnel. Some embodiments may use other angles up to and including 12 degrees. As can be appreciated angles that are too large can introduce errors to the data that can ultimately affect the ability of the system to accurately predict the shear stress profile. Additionally, some embodiments may reflect various angular positions of portions of the model such as an angle of a flap portion which may be different from the main body of the airfoil.

The model 1204 can have a number of tufts 1206 disposed on any exposed surface of the model 1204. For example, the tufts 1206 can be connected to wings of an aircraft or can be placed on a top and bottom surface of an airfoil. The tufts can be made of any type of material that is suitable for testing such that the tuft is allowed to flow in accordance with the flow 1207 generated by the wind tunnel. Additionally, the tunnel 1202 and the model 1204 may be equipped with various taps 1208 disposed at different locations. The taps can serve to measure the dynamic forces generated by the tunnel 1202 along the surface of the model 1204 as well as within the tunnel itself. Typically, pressure taps collect pressure data using transducers which measure the pressure differential between a test point and a reference point. In accordance with various embodiments, numerous pressure taps and associated transducers can be integrated into a single data acquisition system. This can be useful in generating the respective velocity profiles of the model 1204. Some embodiments, can be augmented with oil-clay mixtures that are applied upstream of the model. The oil-clay particles to help improve the overall visualization of the tufts as well as provide additional data regarding the boundary layer properties for use within the physics-informed neural network.

As can be appreciated, tuft visualization may require the use of one or more cameras 1209 located near the model and/or the wind tunnel. The cameras 1209 can be used to provide visual feedback or input data to a computer system 1210 regarding the movement of the tufts. Accordingly, this can be analyzed with respect to the velocity and pressure fields of the model during testing. Additionally, the computer system 1210 can be used to analyze the input data provided from the tufts 1206 the taps 1208. Accordingly, the computer system 1210 can apply the algorithm within a physics-informed neural network to ultimately generate the various profiles and stress data desired.

SUMMARY & DOCTRINE OF EQUIVALENTS

As can be inferred from the above discussion, the above-mentioned concepts can be implemented in a variety of arrangements in accordance with embodiments of the invention. Specifically, systems and methods that utilize tuft data in a physics-informed neural network to estimate shear walls stress profiles along an aerodynamic surface.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:
1. A method for determining shear wall stress comprising:
providing a model of an aerodynamic surface;
determining a first set of input variables from spatial coordinates of the model;
disposing the model within a testing system;
determining a second set of input variables from spatial coordinates of the testing system;
connecting a plurality of tufts to the model in a manner such that the tufts can flow freely in a direction of an applied flow;
applying a generally horizontal dynamic flow force to the model thereby creating movement of the plurality of tufts;
using a camera visualization system to generate input data from the movement of the tufts for use as a third set of input variables;
applying the first, second, and third sets of input variables to a physics informed neural network to generate a set of output flow variables;
utilizing the output flow variables to determine velocity profile of the model; and
utilizing the velocity profile as well as a set of pressure outputs of the model to estimate the shear walls stress of the model.

2. The method of claim 1, further comprising:
performing automatic differentiation on the set of output flow variables to generate a set of residual data wherein the set of residual data is used to generate a loss function and wherein the loss function is used to augment the sets of input variables to improve the output flow variables.

3. The method of claim 1, further comprising:
disposing a plurality of pressure taps on the model wherein each of the plurality of pressure taps can generate pressure data with respect to the dynamic flow force and wherein the pressure data is used as a fourth set of input variables;
and wherein the fourth set of input variable is utilized to generate the output flow variables.

4. The method of claim 1, wherein the model is an airfoil.

5. The method of claim 1, wherein the model is a scaled model of an aircraft.

6. The method of claim 1, wherein the model is disposed at an angle with respect to the horizontal direction of the dynamic flow force.

7. The method of claim 1, further comprising a plurality of pressure taps disposed within the testing system, wherein the pressure taps are used to generate and provide pressure data with respect to the dynamic flow force within the testing system.

8. A system for estimating the shear wall stress of an aerodynamic surface comprising:
a testing apparatus wherein the testing apparatus is configured to generate a dynamic flow force;
a model disposed within the testing apparatus in such a manner that the model is exposed to the dynamic flow force;
a plurality of tufts disposed on an outer surface of the model such that the plurality of tufts move in response to exposure to the dynamic flow force;
at least one camera visualization system configured to capture image data of the movement of the tufts when exposed to the dynamic flow force; and
estimating the shear wall stress of the model using at least the captured image data in a physics-informed neural network.

9. The system of claim 8, wherein the plurality of tufts and image data can be used to generate a first set of input variables that can be used to determine the wall shear stress of the model.

10. The system of claim 9, wherein the testing apparatus comprises a plurality of spatial coordinates that can be used as a second set of input variables, wherein the first and second set of input variables can be applied to the physics-informed neural network to estimate the wall shear stress of the model.

11. The system of claim 9 further comprising a plurality of pressure taps disposed on the model wherein each of the plurality of pressure taps can generate pressure data with respect to the dynamic flow force and wherein the pressure data is used as a third set of input variables.

12. The system of claim 8, wherein the model is an airfoil.

13. The system of claim 8, wherein the model is a scaled version of an aircraft.

14. The system of claim 8, wherein the model is positioned at an angle with respect to the horizontal flow of the dynamic air flow.

15. The system of claim 8, wherein the apparatus is a wind tunnel.

16. The system of claim 14 wherein the angle is at least 2 degrees off of horizontal.

17. The system of claim 14, wherein the angle does not exceed 12 degrees off of horizontal.

* * * * *